(12) United States Patent
Deutschmann et al.

(10) Patent No.: US 7,743,404 B1
(45) Date of Patent: Jun. 22, 2010

(54) METHOD AND SYSTEM FOR SINGLE SIGNON FOR MULTIPLE REMOTE SITES OF A COMPUTER NETWORK

(75) Inventors: Frank Deutschmann, Darien, CT (US); Benjamin J. Tilly, New York, NY (US)

(73) Assignee: Trepp, LLC, New York, NY (US)

( * ) Notice: Subject to any disclaimer, the term of this patent is extended or adjusted under 35 U.S.C. 154(b) by 1594 days.

(21) Appl. No.: 10/264,527

(22) Filed: Oct. 3, 2002

Related U.S. Application Data

(60) Provisional application No. 60/327,113, filed on Oct. 3, 2001.

(51) Int. Cl.
   *H04L 9/32* (2006.01)

(52) U.S. Cl. .......... 726/2; 726/1; 726/5; 726/8; 726/12; 726/27; 713/150; 713/151; 713/152; 713/168; 713/182; 713/193; 709/225; 709/227

(58) Field of Classification Search ............ 726/1, 726/2, 4, 8, 21, 5, 12; 709/224, 219, 225, 709/229; 713/162, 168, 182, 152
   See application file for complete search history.

(56) References Cited

U.S. PATENT DOCUMENTS

| | | | | |
|---|---|---|---|---|
| 5,875,296 A | * | 2/1999 | Shi et al. ................. | 726/5 |
| 5,918,228 A | * | 6/1999 | Rich et al. ............... | 707/10 |
| 5,944,824 A | * | 8/1999 | He ........................... | 726/6 |
| 5,963,915 A | * | 10/1999 | Kirsch ..................... | 705/26 |
| 6,052,785 A | * | 4/2000 | Lin et al. .................. | 726/5 |
| 6,065,120 A | * | 5/2000 | Laursen et al. ........... | 726/5 |
| 6,226,752 B1 | * | 5/2001 | Gupta et al. .............. | 726/9 |
| 6,606,663 B1 | | 8/2003 | Liao et al. | |
| 6,629,246 B1 | * | 9/2003 | Gadi ......................... | 726/8 |
| 6,668,322 B1 | * | 12/2003 | Wood et al. .............. | 713/182 |
| 6,718,328 B1 | * | 4/2004 | Norris ...................... | 707/9 |
| 6,836,845 B1 | * | 12/2004 | Lennie et al. ............ | 713/181 |
| 6,865,680 B1 | * | 3/2005 | Wu et al. .................. | 726/12 |
| 6,892,307 B1 | * | 5/2005 | Wood et al. .............. | 726/8 |

(Continued)

OTHER PUBLICATIONS

T. Bernes-Lee, L. Masinter, M. McCahill, "Uniform Resource Locators (URL)", Dec. 1994, p. 21, Publisher: Network Working Group.

*Primary Examiner*—Nasser Moazzami
*Assistant Examiner*—Shanto M Abedin
(74) *Attorney, Agent, or Firm*—Richard E. Oney; Tiffany & Bosco, P.A.

(57) ABSTRACT

A system and method links first and second computers of a network to implement a single signon feature. The user has a first username for accessing the first computer and a second username for accessing the second computer. The first computer generates a link request having a plaintext component including the first username and the second username and an encrypted component formed by encrypting the plaintext component using an encryption process and a secret. The link request is sent to the second computer, which validates the unencrypted information then generates an encryption result by encrypting the unencrypted information using the encryption process and a second secret known to the second computer and associated with the first network computer. The second computer compares the encryption result with the encrypted component of the incoming link request to determine whether the link request is valid.

19 Claims, 5 Drawing Sheets

U.S. PATENT DOCUMENTS

| | | | |
|---|---|---|---|
| 6,941,465 B1 * | 9/2005 | Palekar et al. | 726/1 |
| 6,957,334 B1 * | 10/2005 | Goldstein et al. | 713/170 |
| 7,032,168 B1 * | 4/2006 | Gerace et al. | 715/501.1 |
| 7,035,854 B2 * | 4/2006 | Hsiao et al. | 707/9 |
| 7,047,560 B2 * | 5/2006 | Fishman et al. | 726/6 |
| 7,093,019 B1 * | 8/2006 | Bertani et al. | 709/229 |
| 7,100,054 B2 * | 8/2006 | Wenisch et al. | 713/185 |
| 7,127,608 B2 * | 10/2006 | Royer et al. | 713/162 |
| 7,137,006 B1 * | 11/2006 | Grandcolas et al. | 713/180 |
| 7,171,692 B1 * | 1/2007 | DeMello et al. | 726/26 |
| 7,243,369 B2 * | 7/2007 | Bhat et al. | 726/6 |
| 2002/0019828 A1 * | 2/2002 | Mortl | 707/200 |
| 2002/0184507 A1 * | 12/2002 | Makower et al. | 713/182 |
| 2003/0046567 A1 * | 3/2003 | Carman | 713/193 |
| 2003/0105774 A1 * | 6/2003 | Oldham | 707/104.1 |
| 2003/0105981 A1 * | 6/2003 | Miller et al. | 713/202 |

\* cited by examiner

METHOD AND SYSTEM FOR SINGLE SIGNON FOR MULTIPLE REMOTE SITES OF A COMPUTER NETWORK

RELATED APPLICATION

This application claims the benefit of U.S. Provisional Application No. 60/327,113, filed Oct. 3, 2001, entitled "Method and System for Linking Websites," which is incorporated herein by reference.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

BACKGROUND

This invention relates generally to distributed data processing systems. More specifically, it relates generally to linking two or more sites of a computer network by providing automatic user login identification without requiring the linked sites to use the same usernames and without requiring the sites to share user password information.

A distributed network system typically includes various computer nodes interconnected by a communications medium. The computer nodes may include nodes that are directly accessed by users, e.g., workstations or user computers, and nodes running specialized applications, e.g., servers or sites. These nodes, the applications running on these nodes, and the users of the distributed system may be referred to as "principals." The methodology employed to reliably verify the identity of a user of a distributed network system prior to allowing the user access to system resources and applications is referred to as authentication. Authentication is generally performed on behalf of the principals.

In a typical distributed network system, the user sends a password to each application running on a remote node in order to access its resources. Each of these entities typically includes a component referred to as an authentication agent that maintains the user's identity and secret (e.g., password). Although the user has been generally authenticated on the network, these agents may not be aware of that authentication, and thus query the user for a password. This can be quite intrusive to the user, particularly in systems requiring users to be authenticated whenever a resource is accessed. Moreover, if the password for each application is different, remembering the password and its associated application can be rather difficult and inconvenient. The user could simply set each password for each application to the same value, but this presents the problem that if the user changes one password and forgets to change the others, the passwords will differ.

On the other hand if the user has the same password for all applications, the local application with which the user "logs-in" typically saves the entered password and automatically sends it to remote applications as needed. This type of remote authentication is susceptible to a password-based system threat known as eavesdropping, i.e., interception of the password by wiretapping the network. To counter such a threat, cryptography is often used to preserve the confidentiality of the transmitted password when authenticating the user to remote applications.

A known mechanism for solving this problem is a single sign-on mechanism. Single signon is a term used to describe a system where a user is required to remember only one user name and password and authentication is provided for multiple services. Here, a main application stores the secrets of the multiple applications or services and, in response to an inquiry from an application or service, provides the appropriate secret on behalf of the user. The user thus does not have to retype the secrets, as it is assumed that if the user has successfully logged into the main application, the workstation can access the secrets of the other applications and provide them to the applications on behalf of the user.

One example of a single signon system is the Kerberos network authentication system, which is designed to allow entities communicating over physically insecure networks to exchange private information. Kerberos works by issuing a unique key, called a ticket, to each user that logs on to the network system. This ticket is issued when the user provides a password. The ticket is then embedded in messages to identify the sender of the message. The Kerberos single signon is possible because all of the network services are under the same administrative control. A centralized database stores keys that are shared with each service, and tickets can be issued, encrypted under the keys of the target services.

Single signon is more difficult, however, when the resources to be accessed are under different administrative control. Perhaps the best example of this is the Internet, where the resources of different websites are under different administrative control. Linking one Internet website to other websites is a common practice. For example, corporate websites can use strategic links to bolster the content of the linked website and promote the use of the website. When these links are to private, access controlled portions of subscription-based websites, however, users have to log in on each different site when the sites are linked. Alternatively, the linked sites have to share user password lists with each other. In the first case, user convenience suffers, and the user does not get the impression of two sites being closely linked or related—the user sees the two sites as simply two separate web environments. In the second case, password sharing creates problems with keeping the password lists up to date across all sites, and poses security issues, with potential for inadvertent disclosure of the password database.

One prior attempt to provide a single signon service for the Internet that utilizes existing Web technology is Microsoft Corporation's Passport service. Like the Kerberos system, the Passport service relies on a centralized Passport server for storing authentication information, as well as consumer profile information for all registered users of the service. Although storage of this information in a central location is convenient, it suffers from the drawbacks discussed above. For example, it makes the server an attractive target for attacks, such as unauthorized access attacks and denial of service attacks, which can compromise user information accessed by the server. The Passport service and some of its drawbacks are discussed in more detail in D. Kormann and A. Rubin, "Risks of the Single Signon Protocol", Computer Networks, volume 33, pages 51-58 (Elsevier Science Press 2000), which is incorporated herein by reference.

From the foregoing, it can be seen that there exists a need for a method and system for linking access-controlled sites by providing automatic user login identification without requiring the linked sites of a computer network to use the same usernames and without requiring the sites to share user password information. Accordingly, it is an object of the present invention to provide such a method and system.

Another object of the invention is to provide such a linking method and system that can utilize existing Internet technologies that are present in most browsers and servers.

Another object of the invention is to provide such a linking method and system with improved user convenience, by not requiring users to logon to each individual website, while maintaining a high degree of security and ease of internal operations.

Another object of the invention is to provide such a method and system that avoids potential privacy issues that may result from sharing user password information between linked sites.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided a method and system for linking two or more network servers such that a user with separate accounts or subscriptions to each server only has to directly identify themselves to one of the sites. The network servers are linked (by providing automatic user login identification between the servers) without requiring the servers to use the same usernames and without requiring the servers to share user password information. Once a user logs into one of the servers (by fully identifying themselves with username/password), they can transparently move between the various linked servers without re-identifying themselves, even though the linked servers don't share user password information. Information about a user known to one server (the originating server) is passed to another server (the destination server) in a way that enables the destination server to validate the user's rights on the destination server. The destination server can then provide access to the user without the user having to enter their password on the destination server, thereby affecting a "single signon" feature between multiple servers or sites of the network, but without requiring the servers to share actual user passwords. Thus, the link passes user information for auto-login to the destination server. The method and system of the invention implements this feature in a secure manner: the link that establishes trust between the two servers is not open to "cracking" (the secret text that is encrypted to establish the trust is not reversible from the link itself), "spoofing" (there is no known way for an unauthorized party to generate valid link text and thus erroneously establish trust), or "replay" (the data passed in the link is only good for a limited time and thus cannot be used again at some future time) attacks. The method and system of the invention allow users to readily move between the linked servers: for the user, this seamlessly ties information from one server to another, making both servers work together on the user's behalf.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

DESCRIPTION

Figure 1:
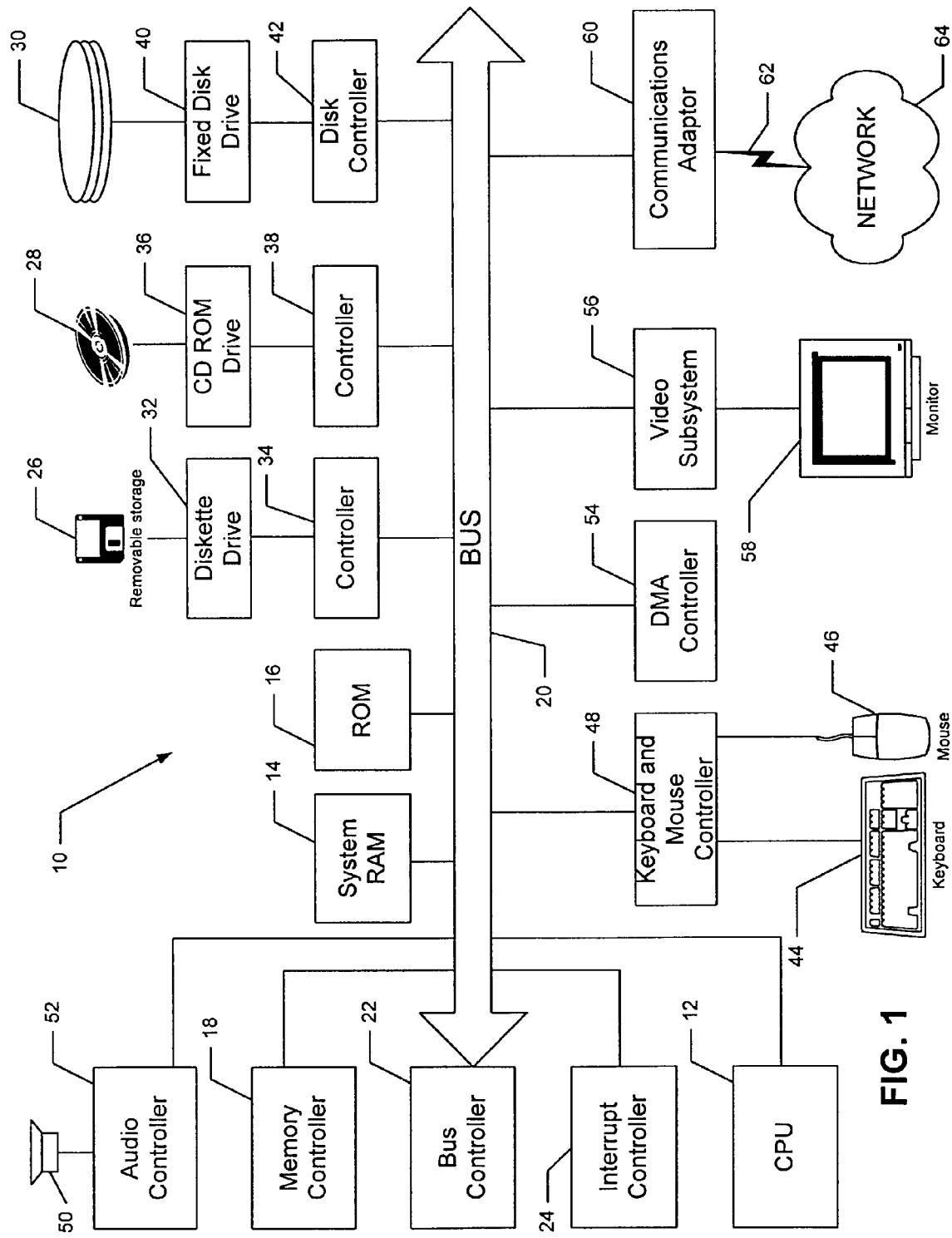
FIG. 1 is a block diagram showing a computer system suitable for practicing the invention.

Reference will now be made in more detail to the presently preferred embodiments of the invention as illustrated in the accompanying drawings, in which like numerals refer to like parts throughout the several views.

GLOSSARY OF TERMS AND ACRONYMS

The following terms and acronyms are or may be used throughout the detailed description:

HyperText Markup Language (HTML). A standard coding convention and set of codes for attaching presentation and linking attributes to informational content within documents. During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyperlinks"). For more information on HTML, see Ian S. Graham, The HTML Source Book, John Wiley and Sons, Inc., 1995 (ISBN 0471-11894-4).

HyperText Transport Protocol (HTTP). The standard World Wide Web client-server protocol used for the exchange of information (such as HTML documents, and client requests for such documents) between a Web browser and a Web server. HTTP includes a number of different types of messages that can be sent from the client to the server to request different types of server actions. For example, a "GET" message, which has the format GET, causes the server to return the document or file located at the specified Universal Resource Locator (URL).

Internet. A collection of interconnected (public and/or private) networks that are linked together by a set of standard protocols to form a distributed network. While this term is intended to refer to what is now commonly known as the Internet, it is also intended to encompass variations that may be made in the future, including changes and additions to existing standard protocols.

Transmission Control Protocol/Internet Protocol (TCP/IP). A standard Internet protocol (or set of protocols) that specifies how two computers exchange data over the Internet. TCP/IP handles issues such as packetization, packet addressing, handshaking and error correction. For more information on TCP/IP, see Volumes I, II and III of Corner and Stevens, Internetworking with TCP/IP, Prentice Hall, Inc., ISBNs 0-13-468505-9 (vol. I), 0-13-125527-4 (vol. II), and 0-13-474222-2 (vol. III).

Uniform Resource Locator (URL). A unique address which fully specifies the location of a file or other resource on the Internet. The general format of a URL is protocol://machine address:port/path/filename. The port specification is optional, and if none is entered by the user, the Web browser defaults to the standard port for whatever service is specified as the protocol. For example, if HTTP is specified as the protocol, the Web browser will use the HTTP default port. The machine address in this example is the domain name for the computer or device on which the file is located.

World Wide Web ("Web"). Used herein to refer generally to both (1) a distributed collection of interlinked, user-viewable hypertext documents (commonly referred to as "Web documents", "Web pages", "electronic pages" or "home pages") that are accessible via the Internet, and (2) the client and server software components that provide user access to such documents using standardized Internet protocols. Currently, the primary standard protocol for allowing applications to locate and acquire Web documents is the HyperText Transfer Protocol (HTTP), and the electronic pages are encoded using the HyperText Markup Language (HTML). However, the terms "World Wide Web" and "Web" are intended to encompass future markup languages and transport protocols which may be used in place of or in addition to the HyperText Markup Language and the HyperText Transfer Protocol.

Computer System

FIG. 1 illustrates the system architecture for an exemplary computer system 10 with which the invention may be implemented. The exemplary computer system of FIG. 1 is for descriptive purposes only. Although the description may refer to terms commonly used in describing particular computer systems, such as an IBM personal computer, the description and concepts equally apply to other systems, including systems having architectures dissimilar to FIG. 1.

Computer system 10 includes a central processing unit (CPU) 12, which may be implemented with a conventional microprocessor, a random access memory (RAM) 14 for temporary storage of information, and a read only memory (ROM) 16 for permanent storage of information. A memory controller 18 is provided for controlling RAM 14. A bus 20 interconnects the components of the computer system 10. A bus controller 22 is provided for controlling the bus 20. An interrupt controller 24 is used for receiving and processing various interrupt signals from the system components. Mass storage may be provided by diskette 26, CD ROM 28, or hard drive 30. Data and software may be exchanged with the computer system 10 via removable media such as the diskette 26 and CD ROM 28. Diskette 26 is insertable into diskette drive 32, which is, in turn, connected to the bus 20 by a controller 34. Similarly, CD ROM 28 is insertable into CD ROM drive 36, which is, in turn, connected to bus 20 by controller 38. Hard disk 30 is part of a fixed disk drive 40, which is connected to bus 20 by controller 42.

User input to the computer system 10 may be provided by a number of devices. For example, a keyboard 44 and a mouse 46 are connected to the bus 20 by a controller 48. An audio transducer 50, which may act as both a microphone and a speaker, is connected to bus 20 by audio controller 52, as illustrated. Other input devices, such as a pen and/or tabloid, may be connected to bus 20 and an appropriate controller and software, as required. DMA controller 54 is provided for performing direct memory access to RAM 16.

A visual display is generated by video subsystem 56, which controls video display 58. The computer system 10 also includes a communications adaptor 60, which allows the system to be interconnected to a local area network (LAN) or a wide area network (WAN) or other suitable network, schematically illustrated by a bus 62 and a network 64.

Operation of computer system 10 is generally controlled and coordinated by an operating system, such as the Windows and Windows NT operating systems, available from Microsoft Corporation, Unix, Linux, IBM's OS2, or Apple Computer's Macintosh operating system, to name a few. The operating system controls allocation of system resources and performs tasks such as processing scheduling, memory management, networking, and I/O services, among other things.

Computer Network

Figure 2:
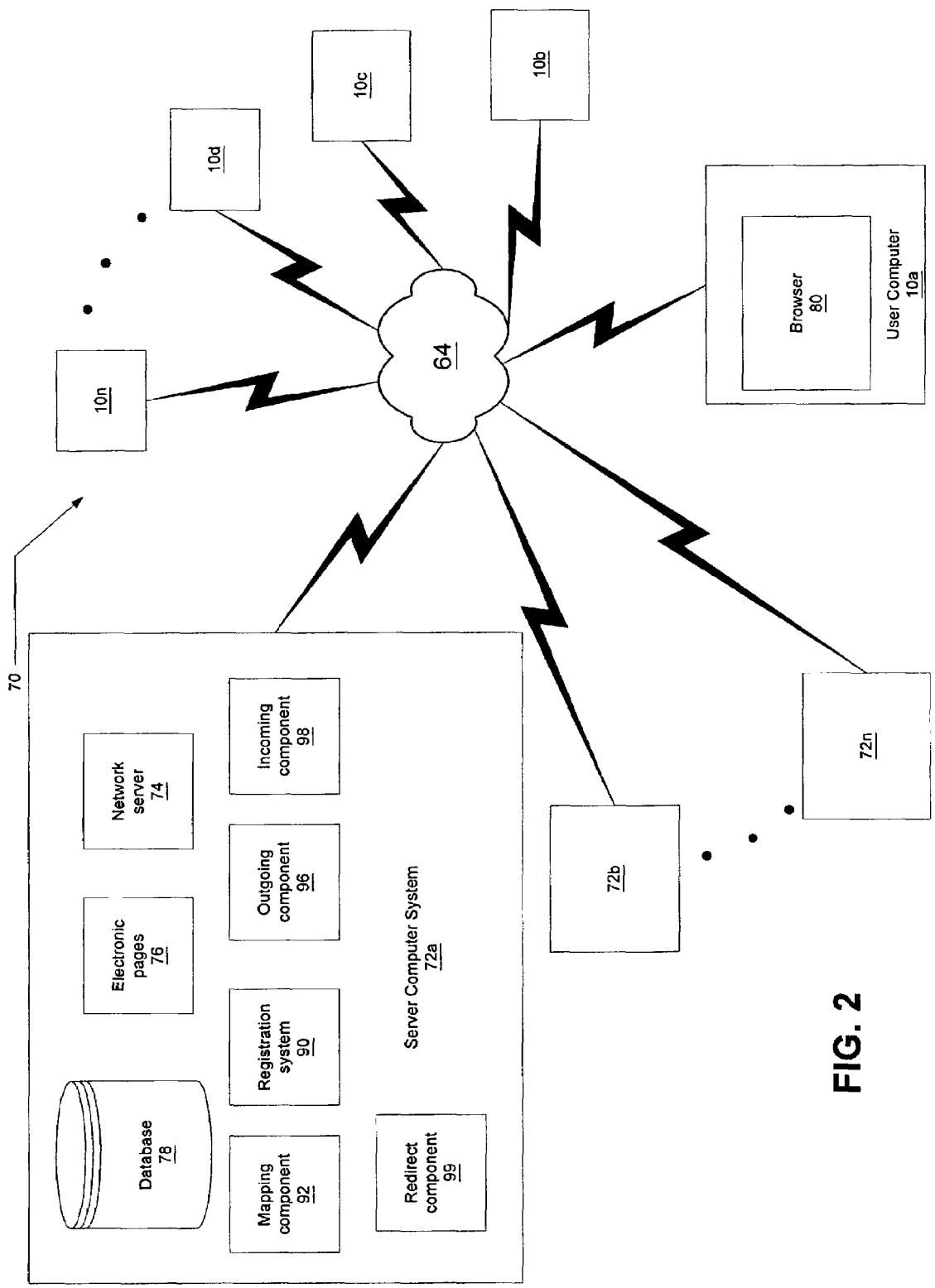
FIG. 2 is a block diagram showing a computer network system suitable for practicing the present invention, including server computer systems and user computers.

FIG. 2 shows the components of the preferred operating environment, a computer network system, for the present invention. Referring to FIG. 2, a public network 64 is shown. As described herein, the exemplary public network of FIG. 2 is for descriptive purposes only. Although the description may refer to terms commonly used in describing particular public networks, such as the Internet, the description and concepts equally apply to other public and private computer networks, including systems having architectures dissimilar to that shown in FIG. 2.

The computer network system 70 includes user computers 10a, 10b, 10c, . . . 10n. It will also be understood that each of the computers 10a-10n may be any device having sufficient attributes of a computer to access the Internet and operate the components on the computer 10, as described in more detail below. The computer network system 70 also includes multiple server computer systems 72a, 72b . . . 72n. Each of the server computer systems 72 can communicate with the user computers 10a-10n via a communications network 64. Each of the server computer systems 72 includes a web server 74, which is configured in a known manner to communicate over the network 64.

As discussed in more detail below, a user can direct each of the user computers 10a-10n to communicate with a network access computer system (not shown), in order to communicate with any of the server computer systems 72 via the communications network 64. The presently preferred communications network 64 includes the Internet, which is a global network of computers. The structure of the Internet, which is well known in the art, includes a network backbone with networks branching from the backbone. These branches, in turn, have networks branching from them, and so on. Routers move information packets between network levels, and then from network to network, until the packet reaches the neighborhood of its destination. From the destination, the destination network's host directs the information packet to the appropriate terminal, or node. A more detailed description of the structure and operation of the Internet, can be found in "The Internet Complete Reference," by Harley Hahn and Rick Stout, published by McGraw-Hill, 1994.

In one advantageous embodiment, the Internet routing hubs comprise domain name system (DNS) servers, as is well known in the art. DNS is a Transfer Control Protocol/Internet Protocol (TCP/IP) service that is called upon to translate domain names to and from Internet Protocol (IP) addresses. The routing hubs connect to one or more other routing hubs via high-speed communication links. It will be recognized, however, that a wide range of interactive communication networks can be employed in the present invention. For example, the communication network 64 can include interactive television networks, telephone networks, wireless data transmission systems, two-way cable systems, customized computer networks, interactive kiosk networks, and the like.

Typically, the network access computer (which can be, e.g., an Internet service provider computer) is connected to an Internet routing hub via a high-speed communications link. The communication link, in turn, connects to the server computer systems 72 via the Internet. When a user desires to access information available on the Internet, the user initiates a connection with the network access computer from the user computer, such as user computer 10a. To do so, the user typically invokes a web browser 80 that executes on the user computer 10a. The browser 80, in turn, establishes a communication link with the network access computer. Once connected to the network access computer, the user can direct the browser 80 to access information provided by any of the server computer systems 72. The network access computer then communicates with the communications medium 64 to establish communication links between the user computer 10a and the server computer systems 72.

User Computers

Each of the user computers 10a-10n is a device that allows a user to interact with the network access computer and the communications medium 64, i.e. the Internet. User computers 10 can connect to the network access computer via modems and appropriate communications links and thereby can communicate with the communications medium 64 and the server computer 72. In an exemplary embodiment, the user computer 10 is a conventional personal computer having an input device, such as a keyboard, mouse, or conventional voice recognition software package; a display device, such as a video monitor; a processing device such as a CPU; and a network interface such as a conventional modem. The user computer 10 runs an appropriate operating system such as the Microsoft Windows 3.1, Microsoft Windows 95, Microsoft Windows 98, Microsoft Windows NT, the Apple MacOS, IBM OS/2, the Unix or the Linux operating systems. As is conventional, the preferred operating system includes a TCP/IP stack, which handles all incoming and outgoing message traffic passed over the Internet.

In one advantageous embodiment, the user computer 10 is a PC-compatible computer having a CPU, a modem, an operating system such as Microsoft Windows 95/98/NT, suitable RAM, suitable hard drive storage space, a mouse and an SVGA monitor. In other embodiments, the user computer 10 could, for example, be a computer workstation, a local area network of individual computers, an interactive television, an interactive kiosk, a personal digital assistant, an interactive wireless communications device, a two-way pager, a cellular telephone, or any other device that can interact with the network access computer. While in such systems, the operating systems will differ, they will continue to provide the appropriate communications protocols needed to establish communication links with the network access computer. Where the network access computer comprises a Web server, the user computer 10 can be any Web-enabled device.

In the preferred embodiment, the user computer 10 utilizes several operational elements including a web browser 80, which is a software program that allows the user computer 10 to access different content providers through the communication medium 62. In one preferred embodiment, the browser 80 is the Netscape Navigator browser marketed by Netscape Communications Corporation or the Microsoft Internet Explorer browser marketed by Microsoft Corporation. One of ordinary skill in the art, however, will recognize that numerous other types of access software could also be used to implement the present invention. These other types of access software could, for example, be other types of Internet browsers, custom network browsers, wireless application protocol (WAP) browsers, and the like.

Server Computer Systems

Still referring to FIG. 2, the server computer systems 72 can be websites connected to the World Wide Web. Each server computer system 72 is equipped with a communications link to the Internet. Each server computer system 72 runs a suitable operating system, such as Sun Microsystems' Solaris operating system, Unix, Linux, Microsoft Windows NT, the Apple MacOS, the IBM OS/2 operating systems, or the like. As is conventional, the preferred operating system includes a TCP/IP stack that handles all incoming and outgoing message traffic passed over the Internet. Each server computer system 72 can, however, include a wide range of devices that provide information, graphics or text. These devices may contain specialized operating systems that communicate using their respective communications protocols. For example, the server computer systems 72 can include network servers, video delivery systems, audio-visual media providers, television programming providers, telephone switching networks, wireless communication centers and the like.

Typically, the server computer systems 72 deliver information to the user computers 10 by utilizing a variety of operational modules. These modules include a network server module 74 and one or more electronic pages 76. The preferred network server module 74 (which is hereinafter referred to as the network server) is a standard Web server software system, which serves electronic pages. As will be apparent to one skilled in the art, the network server module can be implemented with any number of network servers, such as Apache Web server, Netscape Communication Corporation's Internet Server software, Microsoft Corporation's Internet Information Server software, or the like. As is known in the art, such server software can be configured to process messages from the user computers 10 and to display desired electronic pages. In particular, the network server 74 can send copies of HTML pages to each user computer 10 that accesses the server computer system 72.

As is known in the art, the electronic page module 76 within the server computer 72 (which is hereinafter referred to as the electronic pages) provides an organizational structure for presenting information to the user. The electronic pages are created dynamically in response to input from the user computer, typically using a CGI (Common Gateway Interface) program that interfaces with the network server. Typically, the electronic pages are HTML documents, which include HTML encoding. HTML encoding is a script encoding language that is used to define document content information. HTML uses a set of conventions for marking portions of a document so that, when accessed by a browser, each portion appears with a distinctive format. The HTML indicates, or "tags," portions of the document (e.g., the title, header, body text, etc.).

Each of the server computer systems 72 typically includes a relational database (RDBMS) 78 for data storage on a data storage device. The database 78 stores and maintains information necessary to store, present, manage and report on the subject content. As will be apparent to one skilled in the art, the database can be implemented with any number of commercial database programs, including relational database products such as the Oracle database products from Oracle Corporation, the DB2 database products from IBM, the Sybase database products from Sybase, Inc., and others.

The data storage device of the server computer system 72 may include magnetic storage units, such as hard disk drives, optical storage units, CD-ROM drives, flash memory or any other means of data storage known in the art. The functionality provided by the server computer system 72 can be distributed over one computer or more than one computer, depending on the capacity of the computers or computers used.

Each server computer system 72 also includes a registration system 90 for keeping track of valid users and information about those users. It is preferable, but not necessary, that the registration system be capable of updating information about the user and then redirect the user to another file, application or other resource on the network.

Each of the server computer systems 72 also includes a mapping component 92 that can dynamically map known translations of usernames from other server computer systems 72 that are linked in accordance with the invention. For illustrative purposes, this mapping process will be described herein by referring to server computer system 72a as the originating server computer system, which originates a link request, and referring to server computer system 72b as the destination server computer system, which receives a link request. It will be understood, however, that the mapping process is a two-way process, i.e., server computer system 72b could be the originating server computer system and server computer system 72a could be the destination server computer system. If originating server computer system 72a is linked with destination server computer system 72b, then the stored mapping component 92b of destination server computer system 72b can map a given user's username for server computer system 72a (i.e., the originating username) to that user's username for system 72b (i.e., the destination username). The mapping component 92b may be part of the registration system 90b or it may be separate from the registration system, as shown in FIG. 2.

Each server computer system 72 also includes an outgoing component 96, which can redirect the browser 80 of a user computer 10 to another of the server computer systems 72, i.e. the destination server computer system. In normal use, the outgoing component 96 will use a locally authenticated username (along with local state information (such as permission restrictions for that user) and will look up the translation of the originating username to the destination user name using the stored mapping component 92. The outgoing component 96 will then generate an appropriately signed redirect to the browser 80 to redirect the browser to the destination server computer system 72. It is preferable, but not necessary, that the outgoing component 96 handle various error conditions. For instance, if the local username is not mapped to a remote username, the outgoing component 96 may prompt the user for a translation.

Each server computer system 72 also has an incoming component 98 (also referred to herein as a remote acceptor component) that accepts an unauthenticated, but properly formulated, incoming link request to access to the server computer system 72. The incoming component 98 attempts to validate the incoming link request, and then takes appropriate action. Generally, the incoming component 98 validates the incoming requests, recognizes the user translation as being known, and then communicates to the browser 80 how to authenticate itself. Preferably, as described below in more detail, the incoming component 98 also can handle invalid requests, i.e., requests with an unrecognized user translation.

Preferably, though not necessarily, the server computer system 72 also can include a redirect component 99 to remove visible signs in an intra-site redirect URL of the authentication mechanism in the URL (i.e., the link request encrypted text described below). As is known in the art, this intra-site redirect can be used to load the browser 80 with authentication information, and after the browser stores the authentication information locally on the user computer 10, to provide a second redirect to remove the authentication information from the URL. The server computer system 72 also can include various information pages, one-time forms prompting people for a user name translation the first time that the user accesses the server computer system 72, and the like.

Link Request

According to one aspect of the method and system of the present invention, a link request provides the communication mechanism through which the originating server computer system 72a, which generates the link request, communicates to the destination server computer system 72b, which accepts the link request. The link request can be implemented in a secure manner including encrypted text, as discussed below. The link request thus establishes trust between the originating server computer system 72a and the destination server computer system 72b in a manner that is not open to "cracking" (the secret text that is encrypted to establish the trust is not reversible from the link itself), "spoofing" (there is no known way for an unauthorized party to generate valid link text and thus erroneously establish trust), or "replay" (the data passed in the link is only good for a limited time and thus cannot be used again at some future time) attacks.

In the exemplary embodiment and method described herein, the link request is in the form of a link URL. The link URL is generated by the originating network server 74a, and is passed on to the user's web browser 80, which then passes the link URL on to the destination network server 74b as a web page request. By utilizing this link request communication mechanism in accordance with the invention, a user with separate accounts (i.e., subscriptions) to each server computer system 72a, 72b only has to directly identify himself or herself to one of the server computer systems, i.e. the originating server computer system 72a. Information about the user known to the originating server computer system 72a is passed to the destination server computer system 72b in a way that enables the destination server computer system 72b to validate the user's rights on the destination server computer system 72b. The destination server computer system 72b can then provide access to the user without the user having to enter their password on the destination server computer system 72b, thus effecting a "single sign on" feature between multiple server computer systems 72a, 72b, but without requiring the server computer systems 72a, 72b to share actual user passwords between themselves. Thus, the link request passes user information for automatic login of users to the destination server computer system 72b.

Figure 3:
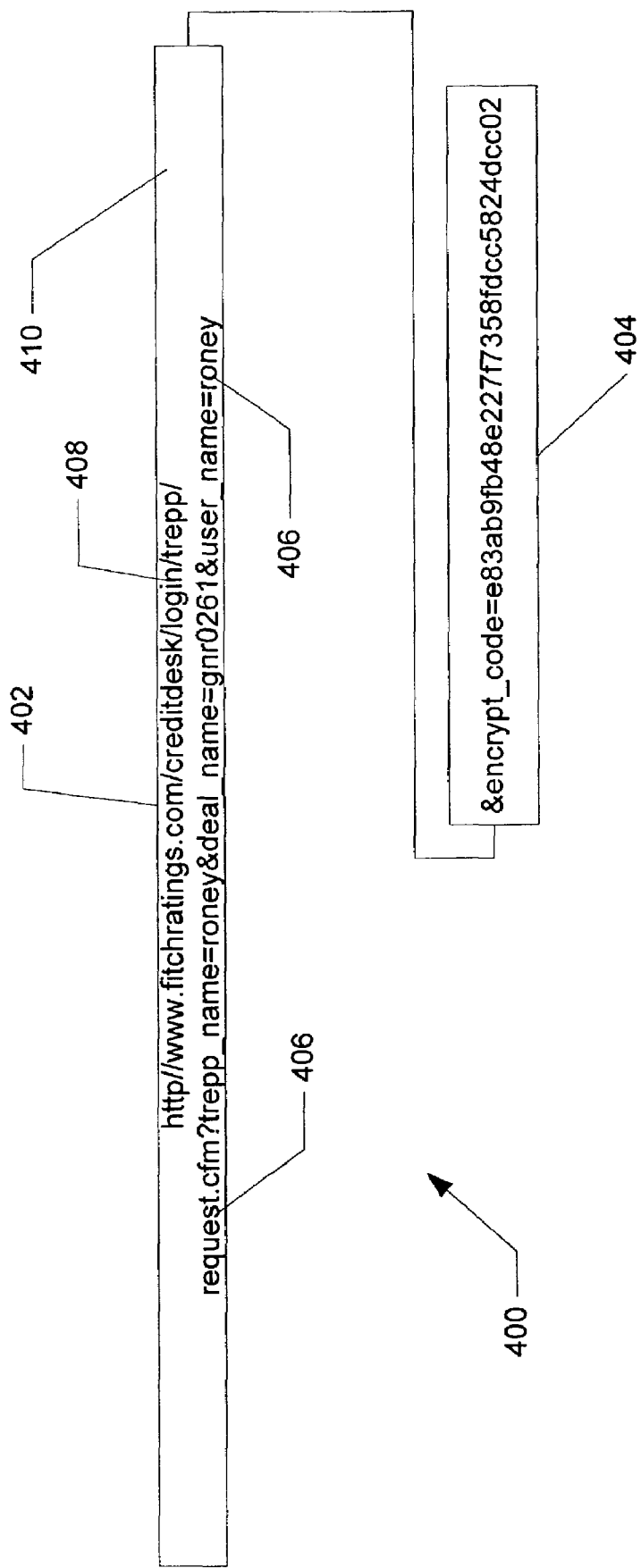
FIG. 3 shows the components of an exemplary link request in the form of a link URL, in accordance with the invention.

FIG. 3 shows the components of an exemplary link request in the presently preferred form of an HTTP URL for use on the World Wide Web:

http://www.fitchratings.com/creditdesk/login/trepp/request.cfm?trepp name=roney& deal name=gnr0261&user name=roney& encrypt code=e83ab9fb48e227f7358fdcc5824dcc02

Generally, the link request 400 includes an unencrypted plaintext component 402 and an encrypted component 404. In the plaintext component 402 is specified various information, including the desired resource of the destination server computer system resource 406, originating username 408, and destination username 410. In the example of FIG. 3, for instance, the string "//www.fitchratings.com/creditdesk/login/trepp/request.cfm" includes the domain name of the destination network server 74b (www.fitchratings.com) and the URL path (creditdesk/login/trepp/request.cfm) for the gateway for incoming requests from the originating network server 74a. The originating username 408 is included in the string "trepp name=roney" and the destination username 410 is included in the string "user name=roney". The string "deal name=gnr0261" includes information necessary to access the specific desired destination resource 406 of the destination network computer system 72b. The encrypted component 404 is formed by combining the originating username, the destination username and a secret link key (word/phrase/number) known only to the administration staffs of the originating server computer system 72a and destination server computer system 72b, then applying a cryptographically strong hashing function (also known as a secure digital signature). Other information, such as a time stamp and a unique sequence number, can be combined with the originating username, the destination username and a secret link key and encrypted with the hashing function. The specific cryptographically strong hashing function used to convey/validate the secret information in the inter-site redirect URL can vary from implementation to implementation. In the example of FIG. 3, the resulting encrypted component is included in the string "encrypt code=e83ab9fb48e227f7358fdcc5824dcc02".

By including in the link request information necessary to access a specific desired resource (e.g. electronic page) of the destination server computer system 72b, the link request allows linking to a destination resource other than the home page or a login page of the of the destination server computer system 72b, thereby providing seamless linking between the originating server computer system 72a destination server computer system 72b.

By including an encrypted section in the link request, the link request cannot be generated by unauthorized entities. Because the encryption process is a hashing function, it does not rely on a "key" or "password" to encrypt the text. It is secure, however, as the encrypted text includes a secret link key known only to authorized people. Thus, only someone who knows the correct secret link key can generate a valid encrypted section to include in the link request. Further, the cryptographically secure hashing function is non-reversible (i.e., it is a one-way process). Thus, there is no known way to decode the encrypted text back into the plaintext, which prevents reverse-engineering of the secret included in the link request if there is an unauthorized interception or capture of the link request. The timestamp can be included in the encrypted information to give the encrypted information a finite lifetime. A unique sequence number can be generated for each use of a link request and can be included in the encrypted information to protect the link request from unauthorized "replay" or reuse if the link request is intercepted after it is first used.

By using a cryptographically strong hashing function, link information and trust can be transferred between two linked computer server systems without requiring a central repository of user information. One suitable cryptographically strong hashing function is the MD5 hashing function available from RSA Security, Inc. of Bedford, Mass. It will be understood by those skilled in the art, however, that there are many other hashing functions equally well suited to this application and the specific cryptographically strong hashing function can vary from implementation to implementation.

Because the encrypted component 404 of the link request cannot be decrypted by applying a function to it, a different means of determining validity is needed. The destination server computer system 74b authenticates (i.e., determines the validity of) the link request by taking portions of the plaintext section of the link request (the originating user name and destination username), combining these with a timestamp and the secret link key (phrase/word/number), then processing this information with the cryptographically secure hashing function, which must be the same as used by the originating server computer system 72a. The destination server computer system 74b then compares the result to the encrypted section 404 of the link request 400. If the result and the encrypted section 404 the link request 400 are the same, the link is valid.

For each linked computer server system 72a, 72b, one or more agreed-upon secret key links can be used at a given time. In one exemplary embodiment, up to three outstanding secret link keys are used. Each secret key link is only known between the two computer server systems. A different password for each direction of the link can be used. The number of shared secret key links for use inter-site (conveyed in encrypted form in the inter-site redirect URL) can vary in implementation. If multiple secret key links are used, the destination site 72b can test a link request to determine which of the multiple secret link keys was used in the generation of the link URL by the originating site 74a. Having multiple, valid, outstanding secret link keys facilitates the secret link key to be changed on a periodic basis, which provides security by limiting the lifetime of a given secret link key.

Similarly, the destination site 74b may have to test multiple different timestamps. By including the timestamp in the encrypted text, the link URL will have a finite lifetime because at some future time, the link URL will expire and no longer be effective for granting access. As a result of the timestamp, however, there must be a mechanism for compensating for time differences and rollovers from one block of time to the next (a block of time being determined by the exact mechanism used to provide for link URL expiration). In one exemplary embodiment of the invention, a timeblock of 24 hours is used. It will be understood, however, that this aspect is readily variable.

The link request according to the invention also allows user mappings (i.e. mapping a user's originating username on the originating server computer system 72a to the user's destination username on the destination server computer system 72b) to be discovered dynamically during the course of using the link request. This avoids the difficulties associated with maintaining such mapping information in some other way, e.g. in a centralized location, and also avoids requiring all linked sites from using the same user names. This is particularly useful in the situation where two pre-existing server computer systems with well established user bases decide to enter into a link partnership: in that case, re-aligning all usernames to be identical between the two sites would be enormously difficult.

Operation of the System

Referring again to FIG. 2, to use the system, a user 200 of a user computer 10 logs into the originating server computer system 72a by interacting with the user computer's browser program 80. The browser program 80 is capable of working with information from a remote server computer systems 72a-n. The browser 80 can operate both in authenticated and non-authenticated modes. The browser accepts redirection from the server 72, and a mechanism must exist for telling the browser 80 how to authenticate itself. In one advantageous embodiment, the browser 80 is a web browser capable of communicating by HTTP or Secure HTTP (HTTPS), which respects Internet standards RFC 2616, RFC 2617, RFC 2818 and RFC 2396, published by the RFC Editor, which is funded by the Internet Society. The text of each of these RFCs is available at ftp://ftp.isi.edu/in-notes/and is incorporated herein by reference. The originating server 74*a* serves HTML pages to the browser 80, which HTML pages include links to other websites accessible via the network in the form of linking URLs.

Figure 4:
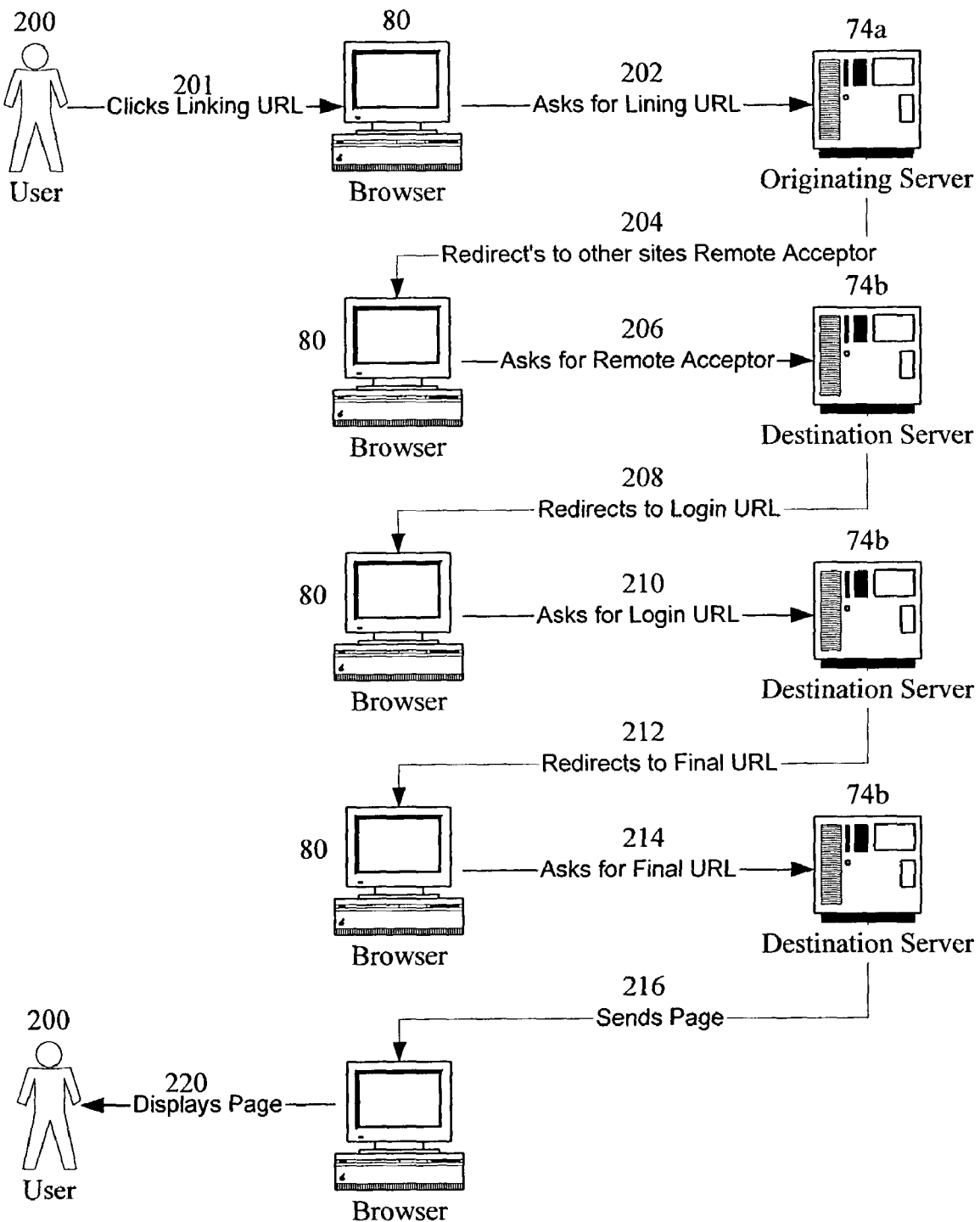
FIG. 4 is a diagram of the interaction between a browser, an originating server and a destination server for site redirection in accordance with the invention.

Referring to FIG. 4, when the user 200 desires access to a linked server computer system, such as the destination computer server system 72*b*, the user 200 clicks on the linking URL for the destination computer server system 72*b*, which is displayed to the user 200 via the browser 80 (step 201). In response, the browser 80 then sends a request for the linking URL to the network server 74*a* of the originating server computer system 72*a* (step 202). The originating network server 74*a* then responds to the browser 80 by redirecting the browser 80 to the destination computer server system's incoming component 98 (i.e., remote acceptor component) (step 204). In response, the browser 80 connects to the destination computer server system 72*b* and requests the incoming component 98*b* (step 206). The destination server 74*b* then redirects the browser 80 to the login URL of the destination website 72*b* (step 208). The browser 80 then requests the destination website login URL (step 210), and the destination website 74*b* redirects the browser 80 to the final URL for the desired resource (HTML page) of the destination website 74*b* (step 212). In response, the browser 80 requests the final URL for the desired resource (step 214) and the destination server 74*b* serves the desired HTML page to the browser 80, which then displays the page to the User 100 (step 220).

When the originating server 74*a* redirects the browser 80 to the destination server 74*b*, a mechanism must exist for telling the browser 80 how to automatically authenticate itself. On the receiving side of the link URL, i.e. at the destination server 74*b*, some means must be used to grant the user's browser 80 access to the destination server computer system 72*b* in general and to specific resources on the destination server computer system 72*b* without requiring the user 200 to enter his or her password for the destination server 74*b*. One suitable approach for doing this is by using the "Basic Authentication" protocol, which is part of the HTTP protocol, and which is known in the art. Using this protocol, and browser login is performed by redirecting the user's browser 80 to a URL of the form: http://name:password@www.yourcompany.com/protected/document.

This causes the user's browser 80 to remember the password for the 'name' (the username on the destination server 74*b*, which in this example is www.yourcompany.com) for the remainder of the browser session. This technique is described in Internet standard RFC 1738, section 3.1, published by the RFC Editor, which is funded by the Internet Society. The text of RFC 1738 is available at ftp://ftp.isi.edu/in-notes/rfc1738.txt and is incorporated herein by reference. The same technique would be equally applicable for "Digest Authentication" protocol. Other authentication protocols (e.g., cookie based authentication), however, would use different approaches, as is known in the art. Any of these approaches can be used to provide the transference of trust from the originating website 74*a* to the destination website 74*b*. As will be apparent to those skilled in the art, the specific mechanism used for user authentication on a website (browser based or cookie based) will change the mechanism used to convey the user's authentication information to the user's browser. For example, for a cookie based authentication mechanism, the destination website 74*b* can serve a page that includes a cookie, which acts as a ticket to be presented to the destination website 74*b* without knowing the username and password.

Figure 5:
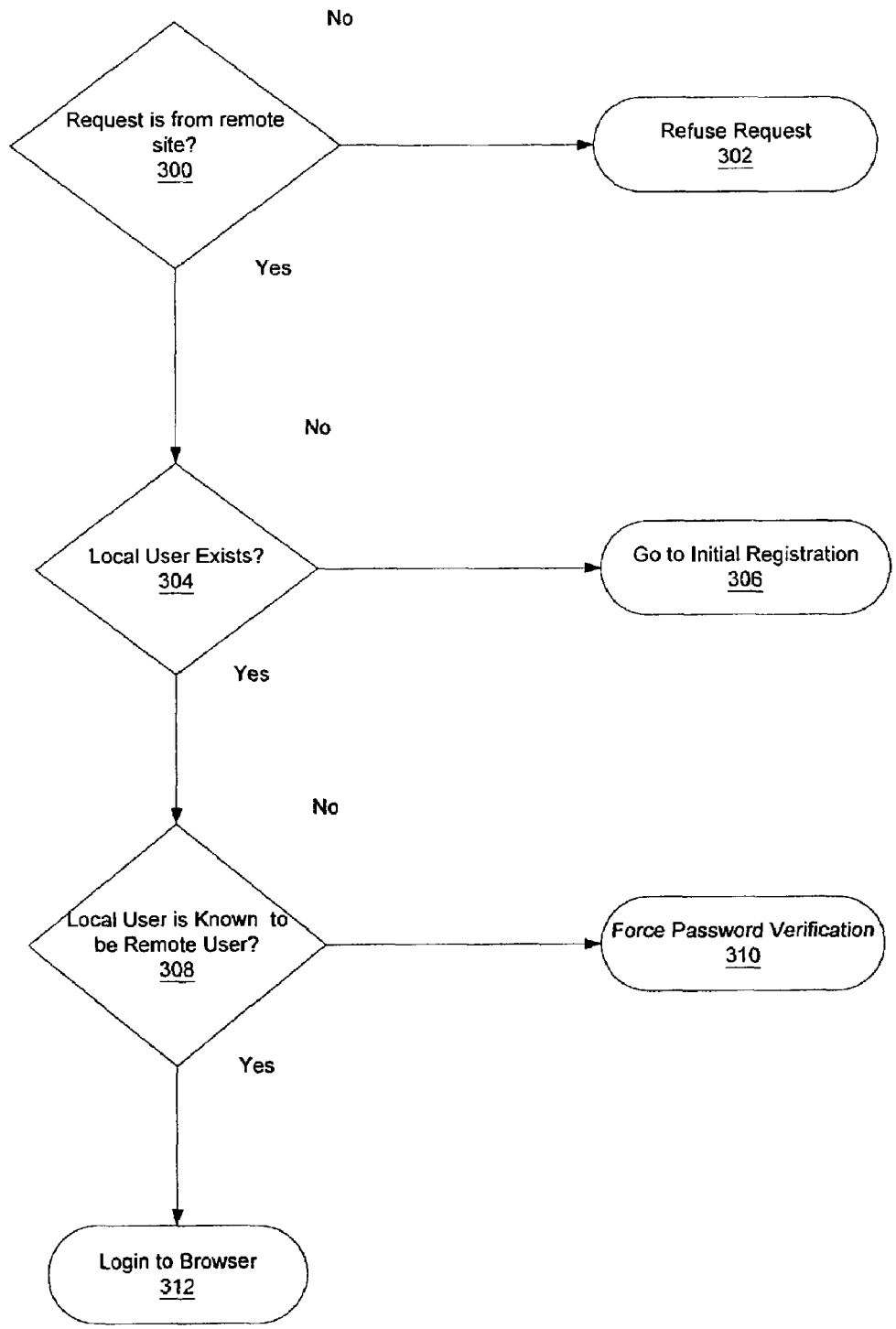
FIG. 5 shows a flowchart of the decision process of the incoming component of the destination server shown in FIG. 3.

Referring to FIG. 5, the process by which the incoming component 98*b* of the destination network server 74*b* accepts an incoming link request, attempts to validate the request and then takes appropriate action will now be explained in more detail. When the incoming component 98*b* receives a link request, it first attempts to validate the link request by taking portions of the plaintext section of the link request, combining these with the secret link key and processing this information with the cryptographically secure hashing function. The incoming component 98*b* then compares the result to the encrypted section of the link request to determine whether the link is valid (step 300). If the request is not valid, i.e. the result does not match the encrypted section of the link, the incoming component 98*b* refuses the request (step 302) by denying access to the destination server computer system 72*b*. If the link request is valid, the incoming component 98*b* then determines whether a local username (i.e., a destination username) exists for the user 200 (step 304). If a local username does not exist, the incoming component 98*b* can initiate a registration process (step 306) so that the user 200 can register with the destination server computer system 72*b*. If a local username exists, the incoming component 98*b* determines whether the local username is known to be associated with an authorized remote username (step 308). The incoming component 98*b* achieves this by determining whether the mapping component 92*b* includes a mapping of the link request destination user name to the origination user name. If the user is not known to be an authorized remote user (i.e., if the mapping component does not have a mapping of the destination user name to the origination username), the incoming component 98*b* can prompt the user for password verification (step 310). If the user is known to be an authorized remote user (i.e., if the mapping component has a stored mapping of the destination user name to the origination username), the incoming component 98*b* logs in the browser 80 to the destination server computer system 72*b* (step 312).

From the foregoing description, it will be appreciated that the first time that a user of the originating computer system 72*a* initiates a link request to a new destination computer system 72*b*, the destination computer system 72*b* will not have registration information for the user and the incoming component 98*b* will progress from step 300, to step 304, then to step 306 to prompt the user for registration information, including a destination username and password. After the user provides this information once, however, the destination computer system 72*b* can store a mapping of the information and the user's subsequent login to the destination computer system 72*b* from the originating computer system 72*a* will be transparent to the user. If a registered user of the linked computer system 72*a*, 72*b* later changes their username for the originating server computer system 72*a*, the incoming component 98*b* can again progress from step 300, from step 300, to step 304, then to step 306, and ask the user for new registration information to store an updated username mapping. Alternatively, the incoming component 98*b* can detect the changed originating username as a sharing of the destination username between multiple users and deny access to the destination computer system 72*b*.

Because the link request includes username mapping information (in the form of an originating username 408 and a destination username 410) and because the mapping component 92b stores a mapping of the originating username 408 and a destination username 410, the method and system of the invention can verify that a user initiating a link request from the originating server computer system 72a also is authorized to access the destination server computer system 72b. Because linking of the server computer systems 72a, 72b relies on this mapping information, both the originating server computer system 72a and the destination server computer system 72b must (at least one time) receive separate verification from the user 200 that the mapping translation is valid, both usernames must always be passed between the two sites, and the digital signature should include both usernames. Without separate verification from the user, all that the destination server computer system can verify from a link request is that the user really is logged in to the destination server computer system, and the user used an authorized originating username on the originating server computer system. But the destination server computer system cannot verify that the user really is an authorized user on the originating server computer system (e.g., that the user is not improperly using the originating username). Thus, if the destination server computer system trusts a translation that only the originating server computer system was provided, nothing stops a user from misrepresenting who they are to the destination server computer system. This compromises both systems. The translation therefore depends on the destination server computer system being told by the originating server computer system that the user is who they say they are there, and having been told by the user, "That translation is really me." By always passing both usernames, and by including both usernames under the protection of the encrypted section, the username mapping cannot be wrongfully manipulated by simple manipulation of the link request. Further, if the username mappings are provided in all uses of the link request, investigations into user violations of terms of use restrictions can be facilitated (particularly with respect to sharing logins/passwords between users).

Appendix A includes exemplary source code for the main linking software components of a presently preferred embodiment of the invention. Except where indicated otherwise, these components are written in the Perl programming language. It will be apparent to those skilled in the art, however, that the software components of the invention can be implemented in any of many suitable programming languages.

The invention thus provides the ability to link websites (providing automatic user login identification) without requiring both sites to use the same usernames, and the ability to link websites without requiring the two sites to share user password information. Once a user logs into one of the websites (by fully identifying themselves with username/password), they can transparently move between the various linked sites without re-identifying themselves, even though the linked websites don't share user password information. The link feature provided by the invention allow users to readily move between the linked websites: for the user, this seamlessly ties information from one website to another, making both websites work together on the user's behalf.

It will be understood to those of skill in the art that many variations in the system and method of the invention are possible. For example, the specific number of redirects used to accomplish browser password loading; the specific details of the expiration mechanism are variable with the implementation. The specific details of user name mapping storage and data storage mechanisms in general needed for the invention to work can vary among implementations. The programming language, webserver(s), webbrowser(s), computer hardware, etc are all variable among implementations. The specific protocol used between the web browser and the web server (specifically, HTTP versus HTTPS, etc) can vary. The specific details of access to a web server via a URL link is open to variation (the item accessed may be a conventional web page/website built from HTML, but could also be a CGI script, a database, an image, an application, etc). In various embodiments of the invention, linking can be provided for anything accessible via a URL, including things not yet implemented (the list of things accessible via URL is constantly expanding).

From the foregoing description, it can be seen that the method and system of the invention possess a myriad of advantages and provide numerous benefits. Because mapping of usernames between linked websites is maintained automatically as part of the linking process, linked websites are not required to maintain specific mappings of usernames between the sites. The invention eliminates the requirement for partner, linked, websites to share user password information. The invention provides a specific means for linked websites to monitor "multiple use" violations by users: situations where several users are sharing a username identifier to access a website, in violation of the terms of use provisions of website subscription contracts. Therefore, partners in a link arrangement using this invention can independently monitor user misuse without requiring any form of assistance or reporting from link partners. The link between websites in accordance with the invention is readily configured to operate in one direction only or in both directions. Further, links to multiple websites, in any configuration, can be set up.

CONCLUSION

While certain preferred methods and embodiments of the invention have been described, these have been presented by way of example only, and are not intended to limit the scope of the present invention. Variations might include variations in terms of the exact details conveyed in the redirect URL, or the specific programming language used, or the encryption algorithm used to obscure the secret part of the redirect URL, to name a few. Additional advantages and modifications will readily occur to those skilled in the art. Accordingly, departures may be made from details described herein without departing from the spirit or scope of the general inventive concept.

What is claimed is:

1. A method for linking a first network computer with a second network computer so that a user of the first network computer is automatically logged in to the second network computer, the user having a first username for accessing the first network computer and a second username for accessing the second network computer, the method comprising the steps of:

generating with the first network computer a link request, wherein the link request includes:
   a plaintext component including information for locating a resource of the second network computer, the first username and the second username; and
   an encrypted component formed by applying an encryption process to encrypt information including the first username, the second username and a secret;
maintaining a mapping of usernames for access by the second network computer;
authenticating the link request with the second network computer including:

generating an encryption result by applying the encryption process to the information in the plaintext component of the link request; and comparing the encryption result with the encrypted component of the link request;

searching with the second network computer the mapping of stored usernames to determine if the mapping of stored usernames includes a mapping of the first username with the second username; and logging the user in to the second network computer if the mapping of stored usernames includes a mapping of the first username with the second username.

2. A method for linking a first network server with a second network server, the method comprising:

receiving a link request at the second network server, wherein the link request includes:

information for locating a resource of the second network server;

a first username for accessing the first network server;

a second username for accessing the second network server, wherein the second username of the link request is determined from a mapping of valid usernames for the first network server to usernames for the second network server; and an encrypted component, wherein the encrypted component is formed by applying an encryption process to encrypt information including the first username, the second username and a secret known to each of the first network server and the second network server; and authenticating the link request, including:

generating an encryption result by encrypting information including the first username and the second username of the received link request using the encryption process and the secret;

comparing the encryption result with the encrypted component of the received link request; and logging the user in to the second network based on the result of comparing the encryption result with the encrypted component of the link request.

3. The method of claim 2 wherein the link request is in the form of a URL.

4. The method of claim 3 wherein the link request is in the form of an HTTP URL.

5. The method of claim 2 wherein the encryption process comprises a hashing function.

6. The method of claim 5 wherein the hashing function is a one-way hashing function.

7. The method of claim 2 wherein the link request includes a timestamp.

8. The method of claim 2 wherein the link request includes a unique sequence number for each use of the link request.

9. The method of claim 2 wherein the first username and the second username are different.

10. A method for redirecting a remote user computer to a second restricted access network resource so that the user of the remote user computer is automatically authenticated on the second network resource, wherein the remote user computer is in communication with a first restricted access network resource and a user of the remote user computer has been authenticated on the first restricted access network resource using a first username and a first password, the method comprising:

receiving a request from the remote user computer to the first network resource to access the second network resource;

using the authenticated first username to determine an associated second username that is a valid username for the second network resource;

generating a link request having a plaintext component including information for locating the second network resource, the first username and the second username and an encrypted component formed by applying an encryption process to encrypt information including the first username, the second username and a secret known to the first network resource and the second network resource;

returning the link request to the remote user computer; and redirecting the remote user computer to the second network resource, including communicating authentication information to the remote user computer and removing visible signs of the authentication information from a redirect URL.

11. The method of claim 10 further comprising automatically authenticating the user on the second network resource using a basic authentication protocol.

12. The method of claim 10 further comprising automatically authenticating the user on the second network resource using a digest authentication protocol.

13. The method of claim 10 further comprising automatically authenticating the user on the second network resource using cookie-based authentication.

14. A method for automatically authenticating a remote user on a second restricted access network resource wherein the user has a second username, the method comprising the steps of:

accepting an incoming link request from a remote user computer, wherein the-a remote user computer is in communication with a first restricted access network resource using a first username that has been authenticated on the first network resource using a first password and wherein the link request has a plaintext component including information for locating the second network resource, the first username and the second username and an encrypted component formed by applying an encryption process to encrypt information including the first username and the second username using a secret known to the first network resource and the second network resource;

generating an encryption result by applying the encryption process to the first username and the second username using the secret;

comparing the encryption result with the encrypted component of the incoming link request to determine whether the link request is valid;

determining whether the second network resource has a known translation of the first username and the second username; and initiating a registration process for registering the user with the second network resource if there is not a known translation of the first username and the second username.

15. The method of claim 14 further comprising authorizing access to the second network resource if the link request is valid.

16. The method of claim 14 further comprising storing a mapping of usernames for the second network resource to usernames for the first network resource.

17. The method of claim 16 further comprising:

maintaining a stored mapping of information that relates usernames authorized for the second network resource with corresponding valid remote usernames; and determining whether the mapping of information includes information relating the second username to the first username.

18. The method of claim 16 further comprising logging the user in to the second network resource if the mapping of information includes information relating the second username to the first username.

19. The method of claim 16 further comprising prompting the user for password verification for the second network resource if the mapping of information does not include information relating the second username to the first username.

* * * * *